United States Patent [19]

Kelly

[11] 4,051,525

[45] Sept. 27, 1977

[54] RAISABLE AND LOWERABLE SURVEILLANCE CAMERA ASSEMBLY

[75] Inventor: Daniel L. Kelly, Flushing, Mich.

[73] Assignee: Anderson Safeway Guard Rail Corporation, Flint, Mich.

[21] Appl. No.: 687,025

[22] Filed: May 17, 1976

[51] Int. Cl.² .............................................. H04N 5/26

[52] U.S. Cl. .................................... 358/108; 358/100; 358/229; 358/87

[58] Field of Search ................. 358/93, 100, 108, 109, 358/229, 87

[56] References Cited

U.S. PATENT DOCUMENTS

| | | | |
|---|---|---|---|
| 2,602,524 | 7/1952 | Shirley | 358/108 X |
| 3,958,116 | 5/1976 | Jones | 240/67 |

*Primary Examiner*—Robert L. Richardson

*Attorney, Agent, or Firm*—Miller, Morriss and Pappas

[57] ABSTRACT

A surveillance camera assembly is mounted upon a selectively raisable and lowerable support assembly provided on a hollow pole shaft. A coaxial cable is connected to the surveillance camera and extends upwardly to pass over a sheave assembly and downwardly into the interior of the pole shaft for fixed engagement with a transition plate fixedly provided on raising and lowering cable means within the pole shaft. The terminal end of the coaxial cable is located below the transition plate and is provided with an electrical plug element so as to permit engagement of the pole-mounted coaxial cable to corresponding ground-mounted coaxial cable means when the transition plate is proximate to ground level and the surveillance camera is in its raised position proximate to the top of the pole shaft.

3 Claims, 4 Drawing Figures

RAISABLE AND LOWERABLE SURVEILLANCE CAMERA ASSEMBLY

SUMMARY OF THE INVENTION

This invention relates to a surveillance camera assembly for use in association with high mast or pole shafts having selectively raisable and lowerable support platforms. This invention finds an application for surveillance of large areas.

A television surveillance camera of the type well known in the art is mounted on a selectively raisable and lowerable support platform which is provided on high mast or pole shaft installation. A coaxial cable utilized to power and actuate the camera is operatively connected thereto in its use position on the ring member support platform. The coaxial cable extends upwardly from the support platform and is positioned over a sheave member located at the top of the high mast or pole shaft. The coaxial cable then extends downwardly from the sheave member into the interior of the pole shaft into fixed engagement with a transition plate or connector fixedly provided on the raising and lowering assembly positioned therein.

The terminal end of the coaxial cable is located below the transition plate and is provided with a plug element adapted for selective fixed operative engagement with corresponding ground-mounted coaxial cable means located at the base of the pole shaft. The ground-mounted coaxial cable is connected to a central remote control monitor and power source (not shown) which actually operates the camera when it is in its raised or elevated operative use position proximate to the top of the high mast or pole shaft.

The transition plate or connector is positioned proximate to the base of the pole shaft when the raising and lowering assembly has been actuated to raise the support platform and surveillance camera mounted thereon to its operative use position at the top of the high mast or pole shaft.

The distance between the transition plate over the sheave to the support platform and camera is always the same during the raising and lowering of the camera and thus the length of the coaxial cable does not vary. As the transition plate moves upwardly within the pole shaft, the support platform and camera are lowered a corresponding and identical distance along the exterior of the shaft. The coaxial cable merely moves over the sheave member as the raising and lowering operations occur. Before actuating the lowering assembly, the only action that need be taken is to disconnect the pole-mounted coaxial cable from the ground-mounted coaxial cable.

A vertical stabilizer cable is provided within the pole shaft with which an extension of the clamping member attached to the transition plate makes slidable contact as it moves upwardly and downwardly within the pole shaft.

PRIOR ART

The devices of the prior art do not show a surveillance camera assembly positioned on a selectively raisable and lowerable support platform provided on a high mast or pole shaft and which is provided with a coaxial power and control cable attached thereto which passes over a sheave at the top of the high mast or pole shaft and downwardly through the pole shaft into selective engagement and disengagement with corresponding ground-mounted coaxial power and control cable means located at the base of the pole shaft.

Representative of the prior art patents involving elevatable and/or remotely positioned elevated surveillance camera or observation or transmitting units are the devices of Richards U.S. Pat. Nos. 3,103,257, Rosenfield 3,689,695, Stith 3,437,753, Galante 3,258,595, Petrides 3,241,145, Foster 3,184,541, Shreckengost 2,995,740, Back 3,889,052, Ogawa 3,882,268, Jennings 3,535,442, Oppenheimer 2,719,043, Brewer 3,757,039, Pearl 3,819,856, Simonson 3,709,121 and Mahlab 3,732,368.

The high mast or pole shaft and associated raising the lowering assembly with which the instant invention is utilized is disclosed and claimed in the copending application (Ser. No. 401,290, about to issue as U.S. Pat. No. 3,958,116). The pole shaft and associated raising and lowering assembly disclosed and claimed in U.S. Pat. No. 3,958,116 is owned, manufactured and sold by the assignee of this application, Anderson Safeway Guard Rail Corporation. However, the instant surveillance camera assembly invention is also useable with other high mast or pole shaft devices having raisable and lowerable external support platforms, such as those shown in Meyer U.S. Pat. Nos. 3,686,498, Pfaff, Jr. 3,292,322, Moyer 2,823,302 and DeSaisset 283,581.

Nowhere in the prior art is there found a surveillance camera assembly which is adapted for use with high mast or pole shaft members having selectively raisable and lowerable support platforms in association therewith. In addition, none of the prior art devices utilize a selectively raisable and lowerable surveillance camera assembly wherein the coaxial power and control cable associated therewith is not reeled in or otherwise coiled during the raising or lowering of the support platform upon which the camera is mounted. Further, none of the prior art devices utilize a polemounted selectively raisable and lowerable surveillance camera wherein the pole-mounted coaxial power and control cable in association therewith is adapted to be selectively engaged to or disengaged from corresponding ground-mounted coaxial power and control cable means provided at the base of the pole or shaft.

OBJECTS

It is therefore an object of this invention to provide a surveillance camera assembly adapted for use in association with high mast or pole shafts having raisable and lowerable support platforms and having great utility in providing surveillance of large areas such as shopping center parking lots.

Another object of this invention is to provide a surveillance camera assembly which is adapted for use with high mast or pole shaft members having selectively raisable or lowerable support platforms and which is provided with a coaxial power and control cable which fixedly engages a transition plate provided on the raising and lowering assembly located within the pole shaft.

Another object of this invention is to provide a pole-mounted surveillance camera assembly having a fixed length coaxial power and control cable which is adapted for selective engagement and disengagement with a corresponding ground-mounted coaxial power and control cable.

Yet another object of this invention is to provide a surveillance camera assembly which is adapted for use with high mast or pole shaft members having selectively raisable or lowerable support platforms in association therewith and which does not require ancillary reel or coil storage means for the coaxial power and control cable associated therewith.

Other objects and advantages found in the construction of this invention will be apparent from a consideration of the following specification in connection with the appended claims and the accompanying drawins.

IN THE DRAWINGS

FIG. 1 is a front elevation schematic view showing the surveillance camera assembly mounted upon a selectively raisable and lowerable support platform provided on a pole shaft and further illustrating the camera coaxial power and control cable positioned over a sheave and extending downwardly within the pole shaft into fixed engagement with the transition plate member and into selective engagement with corresponding ground-mounted coaxial cable means.

GENERAL DESCRIPTION

Figure 1:
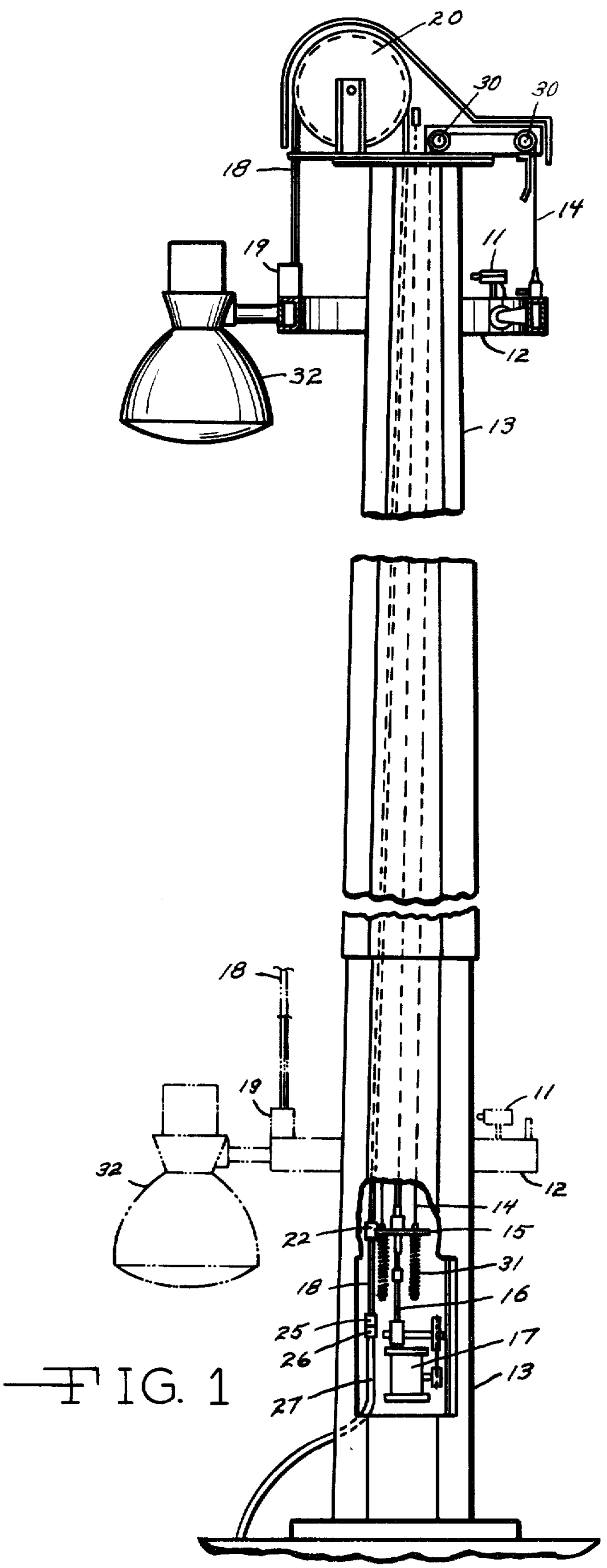

As shown generally in the drawings, a surveillance camera assembly is provided with is adapted for use with raisable and lowerable support platforms provided on high mast or pole shafts. Such high mast or pole shafts are generally utilized in large parking lots, along highways, in large outdoor arenas, and the like. A surveillance camera 11 is adapted for mounting on a raisable and lowerable support platform 12 which is provided on a pole shaft 13. A coaxial power and control cable 18 is operatively connected to the surveillance camera 11 and is adapted to rollably engage a sheave member 20 positioned at the top of the pole shaft 13. The coaxial cable 18 is further adapted for fixed engagement with a transition plate 15 fixedly provided on a raising and lowering drive cable 16 within the pole shaft 13. The terminal end of the coaxial cable 18 extends below the transition plate 15 and is provided with an electrical connector plug which is adapted to selectively engage a corresponding ground-mounted coaxial cable positioned at the base of the pole shaft 13. The sheave 20 which is provided at the top of the pole shaft 13 has an annular groove 21 provided on the outer peripheral surface thereof so as to guidably engage the coaxial cable 18 passing thereover. A stabilizing cable 24 is provided within the pole shaft 13 parallel to and spaced-apart from the coaxial cable 18. The stabilizing cable 24 is in slidable engagement with a hooked extension 23 of the clamping member 22 which fixedly clamps the coaxial cable 18 to the transition plate 15.

SPECIFIC DESCRIPTION

As shown in FIG. 1, a surveillance camera 11 is mounted on ring support platform 12 which is selectively raisable and lowerable on the pole shaft 13 upon which it is mounted. As described in the copending application (Ser. No. 401,290, about to issue as U.S. Pat. No. 3,958,116), the ring support platform 12 is suspended on the exterior of the pole shaft 13 by use of suspension cables 14 which pass into the interior of the pole shaft 13 to engage a transition plate or connector element 15 which is fixedly attached to the continuous loop drive chain or cable 16 and is movable therewith. A drive assembly 17 selectively drives the drive chain or cable 16 within the pole shaft 13 so as to move the transition plate or connector element 15 upwardly and downwardly as desired. The basic overall operation of the pole shaft 13 and associated raising and lowering apparatus is described in detail in U.S. Pat. No. 3,958,116 and will not be repeated at this time but is incorporated herein by reference to U.S. Pat. No. 3,958,116.

While the preferred embodiment of this invention is utilized in connection with the pole shaft structure 13 having the transition plate 15 mounted on the continuous loop drive chain or cable 16 described herein, it is within the scope of this invention to position the transition plate on a cable 16 which is selectively extended and retracted from a winch assembly (not shown) located at the base of the pole shaft 13 so as to raise and lower the support platform 12 as desired. The winch system is well known in the art. The transition plate 15 is fixedly mounted on the drive chain or cable 16 so that it is proximate to the base of the pole shaft 13 when the ring support platform 12 is positioned proximate to the top of the pole shaft 13. As the drive chain or cable 16 is actuated to move the transition plate 15 upwardly within the pole shaft 13, the ring support platform 12 suspended therefrom correspondingly moves downwardly on the exterior of the pole shaft 13. When the transition plate 15 is moved into a position proximate to the top of the pole shaft 13, the ring support platform 12 is moved to ground level to facilitate servicing and repair of the lighting equipment and surveillance camera 11 mounted thereon.

Figure 4:
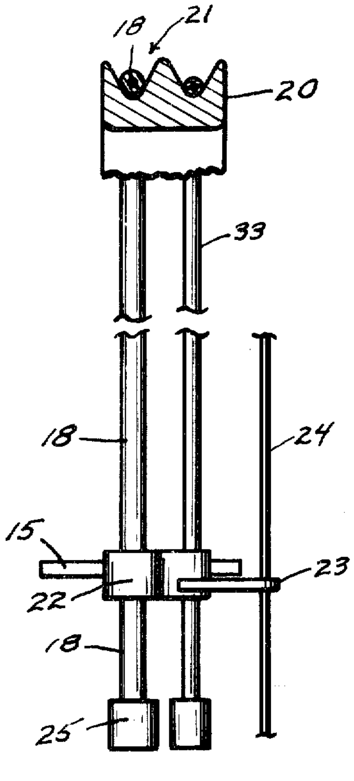
FIG. 4 is a partial schematic cross-sectional view taken on line 4—4 of FIG. 2 illustrating the coaxial cable in its operative use position over the sheave and extending downwardly into fixed engagement with the transition plate and extending downwardly therebeyond with its terminal end provided with a plug element.
Figure 2:
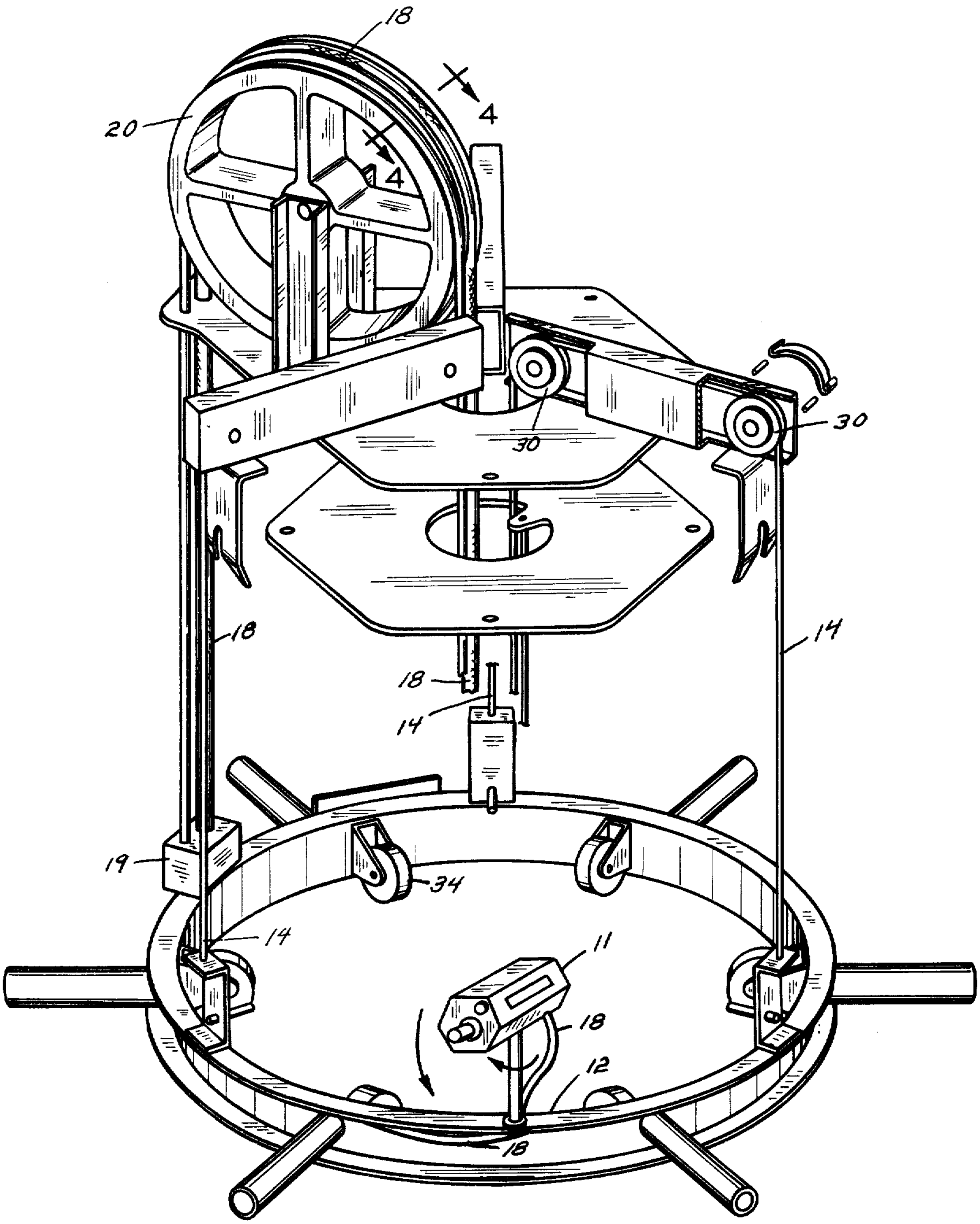
FIG. 2 is a perspective schematic view of the surveillance camera mounted upon the selectively raisable and lowerable support ring platform and further illustrating the coaxial power and control cable connected thereto and extending upwardly over a sheave and downwardly into the pole shaft.

The surveillance camera 11 can be any type of a closed circuit television camera of the fixed, tiltable and/or rotatable types which are well known in the art. As shown in FIGS. 1 and 2, a coaxial power and control cable 18 is operatively connected to the surveillance camera 11 and extends along the ring support platform 12 to an electrical power box 19 provided thereon. The coaxial cable 18 moves through the power box 19 merely as a positioning anchor and is otherwise not operatively connected thereto. The coaxial cable extends upwardly from the power box 19 to engage and pass over the sheave member 20 provided at the top of the pole shaft 13. As shown in FIG. 4 the sheave member 20 is provided within an annular groove 21 which is adapted to receive and guide the coaxial cable 18 as it moves back and forth over the sheave member 20.

Figure 3:
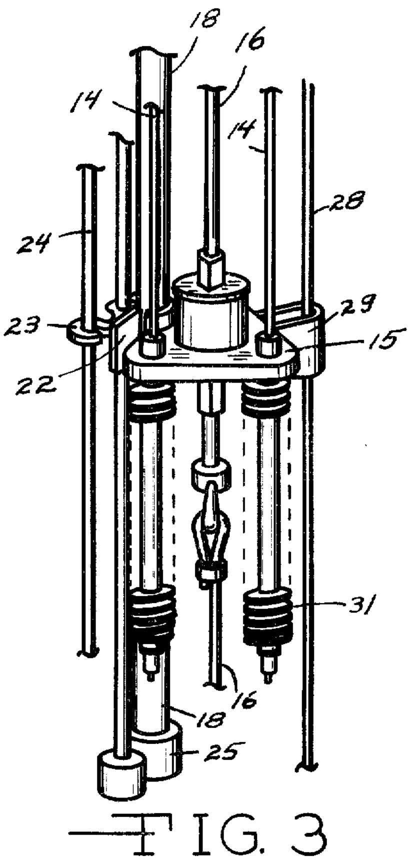
FIG. 3 is a partial schematic view of the transition or connector plate fixedly provided on the raising and lowering drive cable and illustrating the coaxial cable fixedly attached to the transition plate with the terminal end thereof extending therebelow and provided with a connector plug element.

The coaxial cable 18 then extends downwardly within the pole shaft 13 to fixedly engage the transition plate 15. As shown in FIG. 3, the coaxial cable 18 is fixedly attached to the transition plate 15 by use of a clamp member 22. The clamp member 22 is provided with an extension hook guide 23 which slidably engages a stabilizer cable 24 which is provided within the pole shaft 13 so as to provide stability to the coaxial cable 18 as it moves upwardly and downwardly within the pole shaft 13 in response to corresponding movement of the transition plate 15.

As further shown in the drawings, the coaxial cable 18 freely hangs downwardly a short distance beyond the transition plate 15. The terminal end of the coaxial cable 18 is provided with an electrical connector plug 25 which is adapted to selectively engage a corresponding electrical connector plug 26 provided on the ground-mounted coaxial cable 27 located at the base of the pole shaft 13 as shown in FIG. 1. The ground-mounted coaxial cable 27 leads to a remote control and monitoring station not shown in the drawings.

Although not pertinent to this invention, it is noted that a safety cable 28 is provided within the pole shaft 13 and is at all times in slidable operative engagement with the safety lock assembly 29 provided on the transition plate 15. The suspension cables 14 which support the ring platform 12 pass over sheaves 30 and extend downwardly into fixed spring-loaded engagement with the transition plate 15 by use of spring-loaded retainer assemblies 31. The luminaire fixtures 32 which are also provided on the support platform 12 are supplied with electrical power by use of the contactor cable 33. Guide rollers 34 are provided on the ring platform 12 to protectively engage the pole shaft 13. The presence of the luminaires 32 increases the utility of the surveillance camera assembly in night operations.

In operation, the surveillance camera 11 is mounted on the raisable and lowerable support platform 12 provided on any appropriate high mast or pole shaft 13. The surveillance camera 11 is provided with a coaxial power and control cable 18 of fixed length sufficient to pass over a sheave member 20 located at the top of the pole shaft 13 and downwardly within the pole shaft 13 into fixed engagement with the transition plate 15 fixedly provided on the raising and lowering drive chain or cable 16. The coaxial cable 18 is of sufficient length to extend from the surveillance camera 11 positioned on the support platform 12 in its raised position at the top of the pole shaft 13 to and slightly beyond the transition plate 15 at its lowermost position within the pole shaft 13. In this position, the pole-mounted coaxial cable 18 can be operatively engaged to the ground-mounted coaxial cable 27. It should be noted that at all times the distance between the transition plate 15 and the support platform 12 and surveillance camera 11 remains constant. As transition plate 15 is moved upwardly within the pole shaft 13, the support platform 12 and surveillance camera 11 are lowered correspondingly on the exterior of the pole shaft 13. The coaxial cable 18 merely moves over the sheave 20 in response to such movement. There is no reeling or coiling thereof for storage purposes during the raising and lowering operation.

When it is desired to lower the support platform 12 and surveillance camera 11 for maintenance purposes, the pole-mounted coaxial cable 18 is disengaged from the ground-mounted coaxial cable 27. The drive chain or cable 16 is then actuated to move the transition plate 15 upwardly to the top of the pole shaft 13. The support platform 12 correspondingly moves to ground level on the exterior of the pole shaft 13 and the necessary maintenance is accomplished. When the maintenance has been completed, the operation is reversed and the pole-mounted coaxial cable 18 is re-engaged with the ground-mounted coaxial cable 27. During these operations, the coaxial cable 18 merely moves back and forth over the sheave 20 and is not coiled, reeled or otherwise manipulated which could result in damage thereto.

It is thus seen that a highly utilitarian surveillance camera and coaxial cable assembly is provided which is adapted for use with high mast or pole shafts having selectively raisable and lowerable support platforms. The surveillance camera assembly is particularly useful for use in high, relatively inaccessible positions necessary when surveillance of large areas is desired.

Various other modifications of the invention may be made without departing from the principle thereof. Each of the modifications is to be considered as included in the hereinafter appended claims, unless these claims by their language expressly provide otherwise.

I claim:

1. In surveillance camera assembly for use with raisable and lowerable support platforms provided on high mast or pole shafts, the combination including:

a surveillance camera adapted for mounting on a raisable and lowerable support platform provided on a pole shaft;

a coaxial power and control cable operatively connected to said surveillance camera, said coaxial power and control cable in rollable engagement with a sheave member positioned at the top of the pole shaft, said coaxial cable fixedly attached to a transition plate fixedly provided on a raising and lowering drive cable within the pole shaft; and an electrical connector plug provided at the terminal end of said coaxial cable positioned below said transition plate, said electrical connector plug adapted to selectively engage a corresponding ground-mounted coaxial cable positioned at the base of the pole shaft.

2. In the surveillance camera assembly of claim 1 wherein a sheave is provided at the top of the pole shaft, said sheave having an annular groove provided therearound to guidably engage said coaxial cable passing thereover.

3. In the surveillance camera assembly of claim 1 wherein a stabilizing cable is provided within the pole shaft parallel to and spaced-apart from said coaxial cable, said stabilizing cable being in slidable engagement with an extension of the clamping member which fixedly clamps said coaxial cable to the transition plate.

* * * * *